US006191087B1

(12) United States Patent
Opre et al.

(10) Patent No.: US 6,191,087 B1
(45) Date of Patent: *Feb. 20, 2001

(54) ENVIRONMENTALLY FRIENDLY SOLVENT

(75) Inventors: James E. Opre; Eugene P. Bergemann, both of Downers Grove; Mark Henneberry, El Paso, all of IL (US)

(73) Assignee: Vertec BioSolvents, LLC, Mt. Prospect, IL (US)

( * ) Notice: Under 35 U.S.C. 154(b), the term of this patent shall be extended for 0 days.

This patent is subject to a terminal disclaimer.

(21) Appl. No.: 09/591,390

(22) Filed: Jun. 5, 2000

Related U.S. Application Data

(63) Continuation-in-part of application No. 09/389,575, filed on Sep. 3, 1999, now Pat. No. 6,096,699.

(51) Int. Cl.[7] .................................. C11D 7/26; C11D 7/50
(52) U.S. Cl. ......................... 510/201; 510/170; 510/174; 510/211; 510/245; 510/255; 510/505; 134/38
(58) Field of Search ...................................... 510/170, 174, 510/201, 211, 245, 255, 505; 134/38

(56) References Cited

U.S. PATENT DOCUMENTS

| 5,340,595 | 8/1994 | Mulcahey et al. | 134/42 |
| 5,567,427 | 10/1996 | Papadakis et al. | 424/401 |
| 5,587,154 | 12/1996 | Dowell et al. | 424/70.11 |
| 6,096,699 | * 8/2000 | Bergemann et al. | 510/201 |

OTHER PUBLICATIONS

Product Literature for Soysolv Industrial Products.

Product Literature for AG Environmental Products L.L.C.

Product Literature for United Soybean Board, *Soy Methyl Ester Solvents Technical Background.*

Product Literature for Archer Daniels Midland Company.

Product Literature for Huntsman Corporation (Surfonic TDA–3B).

Product Literature for Du Pont Nylon (Dibasic Esters—DBE).

* cited by examiner

*Primary Examiner*—Gregory R. Del Cotto
(74) *Attorney, Agent, or Firm*—Welsh & Katz, Ltd.

(57) ABSTRACT

A solvent that is biodegradable, provides effective solvency for a broad range of tasks and is generally benign to human health is disclosed. This solvent is a mixture of a lactate ester and an edible oil ester having a closed cup flash point in excess of 60° C., and can include other non-halogenated solvents and surfactants.

18 Claims, No Drawings

ENVIRONMENTALLY FRIENDLY SOLVENT

CROSS REFERENCE RELATED TO APPLICATION

This is a continuation-in-part of application Ser. No. 09/389,575 filed on Sep. 3, 1999, now U.S. Pat. No. 6,096,699.

TECHNICAL FIELD

The present invention relates to a solvent that is biodegradable and generally benign to human health, and more particularly to a mixture of a lactate ester and an ester of fatty acid derived from an edible oil; the mixture provides effective solvency for a broad range of tasks. This blended solvent is shown to provide effective performance for paint removal, de-inking, degreasing, and as a general surface cleaning agent that provides for a non-toxic, cost effective alternative to commonly used toxic solvents.

2. Background Art

A solvent is a substance that is generally capable of dissolving another substance, or solute, to form a uniformly dispersed mixture (solution) at the molecular or ionic level. Solvents are either polar (high dielectric constant) or non-polar (low dielectric constant). Water, the most common solvent, is strongly polar having a dielectric constant of 81. Hydrocarbon solvents are non-polar and are comprised of two groups, aliphatics such as alkanes and alcohols, and aromatics, which generally have a higher solvency power than aliphatics. Other organic solvent groups are esters, ethers, ketones, amines, nitrated hydrocarbons and halogenated hydrocarbons.

The chief uses of organic solvents include dissolution of coatings (paints, varnishes, and laquers), industrial and household cleaners, printing inks, and extractive processes. Because many solvents are flammable and toxic to health, there is a need to develop safer solvents for commercial use without sacrificing critical performance.

For decades industrial and household cleaning products have been utilized to provide certain tasks such as paint removers, ink removers, degreasers, etc. Solvents are also used to clean, maintain, and prepare wood, metal, masonry, natural and synthetic fabrics, plastic components, electronic components. Although providing the needs of these many and mission-critical tasks, most solvents generally, are toxic, thus posing a threat to health and to the environment. These environmental and health threats include ozone depleting air pollutants and water pollution that threaten aquatic organisms and drinking water supplies. Many of these solvents are carcinogenic and hazardous to health in general.

Although government, industry and the community at large are all relatively well informed to the dangers of toxic solvents, the dangers associated with the use of such solvents have not dramatically diminished their use. Safer handling, disposal, recycling, recovery and other responsible methods of dealing with toxic substances are improving. However, the availability of safer alternative solvents is still not wide spread, especially in second and third world countries, which is due, primarily, to the high cost of the solvent alternatives and because the majority of the environmentally safer solvent alternatives do not provide satisfactory performance.

In order for an "environmentally friendly" solvent alternative to gain wide spread acceptance, a solvent should meet several criteria. First, it should provide effective performance. Second, it should be economically viable and affordable. Third, it should be widely available and, of course, it should be non-toxic to the environment generally and humans specifically.

Several alternative solvents have been introduced by industry for decades, but in general do not meet the criteria stated above. Further, many of these solvents are not completely biodegradable, just less toxic.

A solvent described hereinafter provides high solvency performance while overcoming the toxicity issues associated with most other organic solvents. In addition, a contemplated solvent is biodegradable.

BRIEF SUMMARY OF THE INVENTION

The present invention contemplates an environmentally friendly solvent. This solvent is biodegradable in normal sewerage treatment plants, and has a low volatile content so that it can be used indoors with minimal ventilation.

A contemplated solvent composition comprises:

(A) about 10 to about 60 weight percent $C_1$–$C_4$ ester of a $C_{16}$–$C_{20}$ fatty acid having a melting point of −10° C. or less;

(B) about 20 to about 75 weight percent of a $C_1$–$C_4$ ester of lactic acid;

(C) zero to about 20 (preferably zero to about 5) weight percent of a surfactant;

(D) zero to about 20 (preferably zero to about 10) weight percent of a thickener; and (E) zero to about 50 (preferably zero to about 35 or more preferably zero to about 20) weight percent organic solvent.

The composition is a homogeneous liquid or gel at zero degrees C and has a closed cup flash point in excess of 60° C., and preferably in excess of 60° C.

In one preferred embodiment, the composition comprises:

(A) about 30 to about 60 weight percent of a $C_1$–$C_4$ ester of a $C_{16}$–$C_{20}$ fatty acid having a melting point of −10° C. or less;

(B) about 30 to about 60 weight percent of a $C_1$–$C_4$ ester of lactic acid;

(C) zero to about 5 weight percent of a surfactant;

(D) zero to about 10 weight percent of a thickener; and (E) zero to about 35 weight percent organic solvent.

Preferably, in the above embodiment, the weight percent of the lactic acid ester is equal to the weight percent of the fatty acid ester, plus or minus about 5 weight percent.

In another preferred embodiment, the composition comprises:

(A) about 20 to about 40 weight percent of a $C_1$–$C_4$ ester of a $C_{16}$–$C_{20}$ fatty acid having a melting point of −10° C. or less;

(B) about 20 to about 40 weight percent of a $C_1$–$C_4$ ester of lactic acid;

(C) zero to about 20 (preferably zero to about 5) weight percent of a surfactant;

(D) zero to about 20 (preferably zero to about 10) weight percent of a thickener; and (E) zero to about 35 (preferably zero to about 20) weight percent organic solvent.

In each of the embodiments of the invention, the particularly preferred $C_1$–$C_4$ ester of a $C_{16}$–$C_{20}$ fatty acid is an ester of a mixture of oleic and linoleic acids. The methyl ester is preferred, and the fatty acid mixture is preferably that of soybean oil so that methyl soyate is particularly preferred.

The particularly preferred $C_1$–$C_4$ ester of lactic acid is the ethyl ester so that ethyl lactate is also particularly preferred.

The present invention has several benefits and advantages.

One benefit of the invention is that a contemplated composition is much safer than a halogenated organic solvent.

A related advantage is that a contemplated composition can be used in occupied areas. The characteristic odor from traditional solvents makes them unsafe to use indoors.

A benefit of a composition according to the present invention is that it has a closed cup flash point greater than about 60° C.

An additional advantage of the present invention is that the cleaning solvent is miscible with water, and thus can be removed with water rinsing, including high pressure water. This rinsing factor can offer some industrial advantages that do not exist with traditional cleaning solvents.

Yet another benefit of a preferred embodiment of the present invention is that it is biodegradable, non-toxic and is derived from two major crops, corn and soybeans.

Another benefit of a paint-stripping embodiment of the invention is that paint strippers containing a contemplated composition can be scraped off, collected and reused. This can not be done with methylene chloride-based paint strippers, due to the significant product that is lost to evaporation.

A further benefit of a paint-stripping embodiment of the invention is that although a contemplated paint stripper composition took a longer period of time to loosen paint than a conventional paint stripper based on methylene chloride, paint stayed wet and workable for a much longer duration.

This offers many advantages in commercial applications.

A further advantage of an ink- and paint-removing embodiment of the invention in the cleaning of air dry inks and paints is that a contemplated composition cleaned tougher grade inks and often cleaned dried inks and paints, whereas soy methyl ester alone showed no effectiveness.

Still another advantage of an ink-removing embodiment of the invention is that the quantity of the ink-removing composition required to be effective is less than is needed with the corresponding petroleum-based products.

Still further benefits and advantages will be apparent to the skilled worker from the discussion that follows.

DETAILED DESCRIPTION OF THE INVENTION

The present invention contemplates an alternative solvent for a multitude of tasks that are commonly practiced today. Separately, lactate ester based solvents, wholly or in combination with other solvents, thixotropic agents, surfactants, pH adjusters and fragrance have been made. In addition, $C_1$–$C_4$ esters of fatty acids derived from edible oils have been developed for certain solvent and cleaning applications. Both lactate esters and edible oil- derived ester solvents have shown to be successful for many application tasks, but separately do not fulfill all properties desired in a solvent and/or cleaning product.

A contemplated composition broadly comprises a solvent blend of about 10 to about 60 weight percent of a $C_1$–$C_4$ ester of lactic acid and about 20 to about 75 weight percent $C_1$–$C_4$ ester of a $C_{16}$–$C_{20}$ fatty acid having a melting point of –10° C. or less, the latter fatty acid esters preferably being a mixture of esters linoleic and oleic acid. This blended solvent provides several key beneficial properties not achieved separately nor in combination with other solvent blend candidates.

More specifically, a contemplated composition comprises (A) about 10 to about 60 weight percent $C_1$–$C_4$ ester of a $C_{16}$–$C_{20}$ fatty acid having a melting point of –10° C. or less;

(B) about 20 to about 75 weight percent of a $C_1$–$C_4$ ester of lactic acid;

(C) zero to about 20 weight percent of a surfactant;

(D) zero to about 20 (preferably zero to about 10) weight percent of a thickener; and (E) zero to about 50 (preferably zero to about 35 and more preferably zero to about 20) weight percent organic solvent.

The composition is a homogeneous liquid or gel at zero degrees C and has a closed cup flash point in excess of 60° C., and preferably in excess of 60° C.

One preferred composition comprises (A) about 30 to about 60 weight percent of a $C_1$–$C_4$ ester of a $C_{16}$–$C_{20}$ fatty acid having a melting point of –10° C. or less;

(B) about 30 to about 60 weight percent of a $C_1$–$C_4$ ester of lactic acid;

(C) zero to about 20 (preferably zero to about 10) weight percent of a surfactant; and (D) zero to about 20 weight percent of a thickener; and (E) zero to about 20 weight percent organic solvent.

Preferably, the weight percent of the lactic acid ester is equal to the weight percent of the fatty acid ester, plus or minus about 5 percent.

Another preferred composition comprises (A) about 20 to about 40 weight percent of a $C_1$–$C_4$ ester of a $C_{16}$–$C_{20}$ fatty acid having a melting point of –10° C. or less;

(B) about 20 to about 40 weight percent of a $C_1$–$C_4$ ester of lactic acid;

(C) zero to about 5 weight percent of a surfactant; and (D) zero to about 5 weight percent of a thickener; and (E) zero to about 35 weight percent organic solvent.

The above preferred embodiment compositions are homogeneous liquids or gels at zero degrees C and has a closed cup flash point in excess of 60° C. (139° F.) [ASTM D93-90], preferably in excess of 60° C.

A contemplated $C_1$–$C_4$ ester of a $C_{16}$–$C_{20}$ fatty acid having a melting point of –10° C. or less is an ester of a fatty acid derived (hydrolyzed) from a so-called "edible" vegetable oil. Vegetable oils are comprised of fatty acid triglyceride esters. Hydrolysis of the vegetable oil esters frees the fatty acids, from which the $C_1$–$C_4$ ester are made. Preferred edible vegetable oils include, without limitation, corn, mustard, niger-seed, olive, peanut, poppy-seed, safflower, rape-seed, sesame, soybean, sunflower-seed and wheat-germ oil.

The $C_{16}$–$C_{20}$ fatty acid is preferably comprised of a mixture whose fatty acids are constituted by about 70 to about 90 percent unsaturated fatty acids such as oleic, linoleic erucic and linolenic acids. Fatty acid esters derived from edible vegetable oils containing a mixture of about 70 to about 90 weight percent oleic and linoleic acids are more preferred. Soybean oil, which is comprised principally of oleic and linoleic acids is the source of the preferred $C_{16}$–$C_{20}$ fatty acid. A methyl ($C_1$) ester is the preferred $C_1$–$C_4$ group. A particularly preferred contemplated $C_1$–$C_4$ ester of a $C_{16}$–$C_{20}$ fatty acid is methyl soyate.

The $C_1$–$C_4$ ester of lactic acid is preferably an ethyl ($C_2$) ester. Exemplary $C_1$–$C_4$ alcohols that can comprise the $C_1$–$C_4$ ester portion of a lactate ester or of a $C_{16}$–$C_{20}$ fatty acid ester include methanol, ethanol, propanol, isopropanol, allyl alcohol, butanol, 3-buten-1-ol, t-butanol and sec-butanol.

In some contemplated embodiments, the $C_1$–$C_4$ ester of a $C_{16}$–$C_{20}$ fatty acid is present at about 10 to about 60 weight percent and the $C_1$–$C_4$ ester of lactic acid is present at about 20 to about 75 weight percent. In preferred embodiments, each of these two ingredients is present at about 30 to about 60 weight 30 percent.

A contemplated composition can also contain up to about 50 weight percent of an organic solvent. A contemplated solvent is biodegradable and can be illustrated by a solvent including but not limited to mixed methyl esters of $C_4$–$C_6$ dibasic acids, N-methylpyrrolidone (NMP), d-limonene, tetrahydrofurfuryl alcohol (THFA) and di-$C_2$–$C_3$ alkylene glycol mono and di-$C_1$–$C_6$ alkyl ethers such as dipropylene glycol n-butyl ether (DPNB), dipropylene glycol methyl ether, diethylene glycol t-butyl methyl ether and diethylene glycol butyl ether. Preferably, the organic solvent is a $C_1$–$C_4$ ester of a $C_3$–$C_{10}$ dicarboxylic acid, as discussed below. A contemplated organic solvent is free of halogens. The organic solvent plays a role as a useful bridging solvent, helping to maintain a homogeneous solution and helping to dissolve assorted components.

For use as an organic solvent with the invention, mixed methyl esters of $C_3$–$C_{10}$ dibasic include $C_4$–$C_6$ dibasic acid esters that are commercially available from DuPont Nylon Intermediates and Specialties, Wilmington, DE under the designation DBE. Seven DBE fractions are available that differ in the amounts of each of three diesters (dimethyl adipate [$IC_6$,] dimethyl glutarate [$C_5$] and dimethyl succinate [$C_4$]) present. Each of the products examined was useful, with the material sold as DBE-3 being preferred. That material is said by its manufacturer to contain 89 weight percent dimethyl adipate, 10 weight percent dimethyl glutarate and 0.2 weight percent dimethyl succinate.

A contemplated composition can also contain up to about 20 weight percent of a surfactant. Lesser amounts of surfactant than the full 20 weight percent are typically present when a surfactant is utilized, as is illustrated by the above-enumerated preferred embodiments and the examples that follow.

Surfactants are named herein following the nomenclature system of the *International Cosmetic Ingredient Dictionary*, 5$^{th}$ ed., J. A. Wenninger et al. eds., The Cosmetic, Toiletry, and Fragrance Associaton, Washinton, D.C. (1993), usually followed by a chemical name and a trademark name of a particular product. Exemplary surfactants are isotridecyl alcohol tri-ethoxylate (Surfonic® TDA-3B, Huntsman Corp.), $C_9$–$C_{11}$ pareth-6 [polyethylene glycol ether of mixed synthetic $C_9$–$C_{11}$ fatty alcohols having an average of 6 moles of ethoxalate; Neodol® 91.6], $C_{11}$–$C_{15}$ pareth-59 [polyethylene glycol ether of mixed synthetic $C_{11}$–$C_{15}$ fatty alcohols having an average of 59 moles of ethoxalate; Tergitol® 15-S-59], nonoxynol-6 [polyethylene glycol (6) nonylphenyl ether; Tergitol® NP-6], nonoxynol-9 [polyethylene glycol (9) nonylphenyl ether; Tergitol® NP-9], and a modified alkanolamide alkanolamine [Monamine® 1255].

Surfactants containing aromatic groups, such as non-ylphenyl groups, are less preferred because they are not as biodegradable as the others. Preferred surfactants are branched and linear alcohol ethoxylates. Most preferred surfactants are alcohol ethoxylates. The addition of a surfactant to a composition comprising a $C_1$–$C_4$ ester of a $C_{16}$–$C_{20}$ fatty is preferred. The addition of a surfactant typically makes the cleaner more effective.

A contemplated solvent composition can also include a thickener that provides a "gel-like" consistency to the composition to minimize drip and running of the composition when applied to an other than horizontal surface. Such a thickened consistency can also be useful in an application to a horizontal surface. It is unknown whether a contemplated thickened composition is technically a gel, but that term is used herein to mean a non-solid composition at room temperature that is spreadable, but barely to non-pourable at room temperature.

Preferred thickeners are polysaccharide derivatives having nonionic functionalities such as alkyl alcohol or ether groups. Exemplary thickeners include methyl cellulose, hydroxyethyl cellulose, hydroxypropyl cellulose, hydroxypropyl methyl cellulose, corn starch, hydroxyethyl corn starch, and hydroxypropyl corn starch. Exemplary preferred thickeners include Propylene Glycol Thickener Klucel®-H and Baragel Methocel® 311.

A contemplated composition can also include a perfume (fragrance) to help mask the odor of the 25 components and a colorant. These inactive ingredients are present, if at all, in minor amounts that do not exceed about 5 weight percent in aggregate. Although such inactive ingredients can be present in any contemplated composition, they are not included in a recitation of a contemplated embodiment as they are inactive as solvents.

Contemplated compositions are substantially miscible with water, unlike many petrochemical-based cleaning solvents. Water miscibility is advantageous, because it is easier to handle the cleaning solutions, dispose of them, dilute them and rinse them off of components. A biodegradable solution of the invention can be degraded in standard sewerage treatment plants, as opposed to special chemical waste handling procedures.

A contemplated composition is substantially free of added water. Thus, although some water can be present as a result of being an impurity of a constituent, water is typically not added to a composition, and a composition typically contains 5 weight percent water or less. The weight percent of the compositions described herein refers to the weight percent of the organic phase, and does not include the mass of any added water. A contemplated composition is also substantially free of halogenated compounds so that only contaminating amounts of such materials are present.

In some embodiments, a contemplated composition discussed above is used as a concentrate, and as such, it can be admixed with up to about 30 weight percent water prior to use. In a preferred concentrate usage, a contemplated composition is admixed with water and emulsified prior to use.

The present invention is illustrated in the non-limiting examples that follow.

EXAMPLE 1

Formulation A, Paint Stripping Gel

| Weight Percent | Ingredient |
| --- | --- |
| 11.0 | Soy Methyl Ester (Methyl Soyate) CAS No. 67784-80-9 |
| 74.0 | Ethyl Lactate CAS No. 97-64-3 |
| 6.0 | Surfactant--6M Nonyl Phenol |
| 6.0 | Thickener--Propylene Glycol-Klucel ®-H or Baragel Methocel ® 311 Methyl Cellulose (cellulose methyl ether) CAS NO. 9004-67-5 |
| 3.0 | Fragrance |

Mix ingredients in order listed. Appearance: dark golden thick gel with mild odor.

EXAMPLE 2
Formulation B, Paint Stripper

| Weight Percent | Ingredient |
|---|---|
| 74.0 | Ethyl Lactate CAS No. 97-64-3 |
| 14.0 | Soy Methyl Ester (Methyl Soyate) CAS NO: 67784-80-9 |
| 6.0 | Surfactant--Tergitol ® 15-S-59 |
| 6.0 | Thickener--Propylene Glycol Thickener Klucel ®-H or Baragel Methocel ® 311 Methyl cellulose (cellulose methyl ether; CAS NO: 9004-67-5) |

Mix ingredients in order listed. Appearance: golden paste.

EXAMPLE 3
Formulation C, Liquid Paint Stripper

| Weight % | Ingredient |
|---|---|
| 30 | Soy Methyl Ester (Methyl Soyate) CAS No. 67784-80-9 |
| 35.0 | Ethyl Lactate CAS 97-64-3 |
| 35.0 | Organic solvent--Tetrahydrofurfuryl Alcohol (THFA; QO Chemical) |

Mix ingredients in order listed. Appearance: light golden liquid.

EXAMPLE 4
Formulation D, Paint Stripper

| Weight Percent | Ingredient |
|---|---|
| 20.0 | Soy Methyl Ester (Methyl Soyate) CAS No: 67784-80-9 |
| 40.0 | Ethyl Lactate CAS No. 97-64-3 |
| 35.0 | Organic solvent--DBE-1 Dimethyl glutarate CAS No: 1119-40-0 Dimethyl adipate CAS No: 627-93-0 Dimethyl succinate CAS No: 106-65-0 |
| 5.0 | Thickener Blend Propylene Glycol Thickener Klucel ®-H or Baragel Methocel ® 311 Methyl Cellulose (cellulose methyl ether) CAS No: 9004-67-54 |

Mix ingredients in order listed. Appearance: light golden paste, heavy viscosity, mild odor.

EXAMPLE 5
Formulation E, Fat And Grease Remover

| Weight Percent | Ingredient |
|---|---|
| 35.0 | Soy Methyl Ester (Methyl Soyate) CAS No: 67784-80-9 |
| 20.0 | Ethyl Lactate CAS No. 97-64-3 |
| 30.0 | Organic solvent--d-Limonene (Florida Chemical Co., Inc.) CAS No: 5989-27-5 |
| 15.0 | Surfactant Blend Tergitol ® NP-6 & Tergitol ® NP-9 (Union Carbide Corporation) |

Mix ingredients in order listed. Appearance: light golden liquid, mild citrus odor.

EXHIBIT 6
Formulation F, Heavy Grease Remover

| Weight Percent | Ingredient |
|---|---|
| 39.0 | Soy Methyl Ester (Methyl Soyate) CAS No: 67784-80-9 |
| 21.0 | Ethyl Lactate CAS No. 97-64-3 |
| 10.5 | Surfactant--Neodol ® 91.6 (Shell Chemical) |
| 10.5 | Surfactant--Monamine ® 1255 (Mona Corporation) |
| 19.0 | Organic solvent--Dipropylene Glycol n-Butyl Ether (DPNB; Arco Chemical) |

Mix ingredients in order listed. Appearance: light amber liquid, mild odor.

EXAMPLE 7
Formulation G, Gel Paint Stripper

| Weight Percent | Ingredient |
|---|---|
| 20 | Ethyl Lactate CAS No. 97-64-3 |
| 20 | Soy Methyl Ester (Methyl Soyate) CAS NO: 67784-80-9 |
| 20 | Organic solvent--N-Methylpyrrolidone |
| 30.0 | Organic solvent--DBE-3 Dimethyl glutarate CAS NO: 1119-40-0 Dimethyl adipate CAS NO: 627-93-0 Dimethyl succinate CAS NO: 106-65-0 |
| 5.0 | Thickener Blend Propylene Glycol Thickener Klucel ® -H or Baragel Methocel ® 311 Methyl Cellulose (Cellulose Methyl Ether) CAS NO: 9004-67-54 |
| 5.0 | Surfactant 6M Nonyl Phenol |

Mix ingredients in order listed. Appearance: light golden gel, mild odor.

EXAMPLE 8
Paint Stripping

| | |
|---|---|
| Ingredients: | Formulation A (Example 1) |
| Test Panel: | Wood, Oak approximately 90 years of age. |
| Paint: | 2 Coats of White Latex Paint with a cure time of over 5 years |
| Cleaning Method: | Extended Dip, 100% solution of Formulation A |

| | |
|---|---|
| Environment: | 75° F. controlled interior environment, 50% humidity, ventilation minimum. |
| Time: | Test materials was submerged for 2 hours. |

The test panel was dipped and submerged in solution. After 2 hours test panel was removed and immediately scrubbed with non-absorbent nylon scrub pad. At conclusion of scrubbing test panel was rinsed with water and permitted to air dry.

When the test panel was removed from solvent bath, it was apparent to the eye that paint was thoroughly attacked and penetrated by solvent. Paint appeared soft and showed significant bubbling at many locations. Upon scrubbing, 80% of paint was immediately removed. Further scrubbing removed remaining paint. A second test on a similar panel provided the same results.

It is apparent there are many applications for a point dip solvent of this type. The thickening agent permits the solvent to be applied directly to material rather than dipped. The dipping procedure was chosen to permit maximum solvent contact without solvent drying or hardening. This was also chosen because it is a common cleaning method within the paint removal and furniture stripping business.

Comparative Test

A traditional paint stripper containing methylene chloride was tested under same conditions. It showed effectiveness at dip times of less than 30 minutes. However, solvent vapors were so strong the test could not be conducted under same test conditions. The test conditions had to be moved to exterior location, for ventilation purposes. Also, safety clothing was necessary. Gloves and goggles were also necessary to handle traditional solvent. Dip times had to be closely monitored due to solvent lost to evaporation. Waste posed some disposal problems because of the large concentrations of methylene chloride. The latex paint presented no disposal problems until mixed with methylene chloride.

EXAMPLE 9

Paint Stripping

| | |
|---|---|
| Ingredients: | Formulation B (Example 2) |
| Appearance: | golden paste |
| Odor: | Slight odor |
| Test Panel: | Wood, Oak approximately 90 years of age. |
| Paint: | 2 Coats of White Latex Paint with a cure time of over 5 years |
| Cleaning Method: | Brush on 100% solution of Formulation B |
| Environment: | 75° F. controlled Interior environment, 50% humidity, ventilation minimum |

The test panel was brush coated with approximately ⅛-inch thick amount of Formulation B. After 60 minutes, the test panel was scraped with putty knife. At conclusion of scraping, the test panel was rinsed with water and permitted to air dry.

At 15 minutes, it was apparent to the eye that paint was being attacked and penetrated by solvent. The paint appeared soft and showed significant bubbling at many locations. Upon scraping, about 80% of paint was immediately removed. Further scraping removed remaining paint. A second test provided the same results with a second test panel.

The thickening agent permits the solvent to be applied directly to material rather than dipped. This formulation takes a longer time to show effectiveness in loosening paint, compared to traditional high odor paint strippers. However, in applications where time is not an issue this paint remover is superior to traditional methods.

Comparative Test

A traditional paint stripper containing methylene chloride was tested under same conditions. It showed effectiveness at 10 minutes. However, solvent vapors were so strong the test could not be carried out under the same test conditions, and the test had to be moved to exterior location for ventilation purposes. Also, safety clothing was necessary. Gloves and goggles were also necessary to handle traditional solvent. Waiting time had to be closely monitored due to solvent lost to evaporation. Waste posed some disposal problems because of the large concentrations of methylene chloride. The latex paint presented no disposal problems until mixed with methylene chloride.

EXAMPLE 10

Paint Stripping

| | |
|---|---|
| Ingredients: | Formulation D (Example 4) |
| Appearance: | Light golden paste |
| Odor: | mild odor |
| Test Panel: | Wood, Oak approximately 90 years of age. |
| Paint: | 2 Coats of White Latex Paint with a cure time of over 5 years |
| Cleaning Method: | Extended Dip, 100% solution of Formulation D |
| Environment: | 75° F. controlled interior environment, 50% humidity ventilation minimum |

The test panel was dipped and submerged in solution. After 2 hours the test panel was removed and immediately scrubbed with non-absorbent nylon scrub pad. At the conclusion of scrubbing lest panel was rinsed with water and permitted to air dry.

When the test panel was removed from solvent bath, it was apparent to the eye that paint was being attacked and penetrated by solvent. Paint appeared soft and showed some bubbling. Upon scrubbing, about 70% of paint was immediately removed. Further scrubbing removed remaining paint. A second test provided the same results using a similar panel.

Comparative Test

A traditional paint stripper containing methylene chloride was tested under same conditions. It showed effectiveness at dip times of less than 30 minutes. However, solvent vapors were so strong test could not be conducted under same test conditions. Test conditions had to be moved to exterior location, for ventilation purposes. Also, safety clothing was necessary. Gloves and goggles were also necessary to handle traditional solvent. Dip times had to be closely monitored due to solvent lost to evaporation. Waste posed some disposal problems because of the large concentrations of methylene chloride. The latex paint presented no disposal problems until mixed with methylene chloride.

EXAMPLE 11
Grease Removal

| | |
|---|---|
| Ingredients: | Formulation E (Example 5) |
| Appearance: | Golden liquid. |
| Odor: | Slight citrus odor. |
| Test Panel: | Stainless steel with heavy accumulation of grease. |
| Cleaning Method: | Spray on 100% solution of Formulation E |
| Environment: | 75° F. controlled interior environment, 50% humidity, ventilation minimum. |

The test panel was mist sprayed with formulation until saturated. After 30 seconds, the test panel was wiped with paper towel. At the conclusion of wiping, the test panel was mist sprayed with water, wiped again and permitted to air dry.

It was immediately apparent to the eye that rease was being attacked and penetrated by solvent. rease began to loosen and returned to a liquid state. When test panel was wiped with paper towel, the grease emulsified with solvent. A water rinse completed the cleaning process. When water was mist sprayed, the solvent and grease emulsification turned white. An emulsification of grease, solvent and water then occurred. Panel was thoroughly cleaned with no grease residues remaining. A second test using a second, similar panel provided the same results.

Comparative Test

A traditional aqueous grease remover was tested containing 2-butoxyethanol (CAS No.: 111-76-2), lauryldimethylamine oxide (CAS No.: 1643-20-5) and water (CAS No.: 7732-18-5). Formulation E was much more effective. The traditional cleaner required multiple applications and extended scrubbing times. The scent of the traditional cleaner was less noticeable. However, for grease removal applications involving heavy accumulations of grease, there was no comparison. Formulation E out performed the traditional cleaner. Formulation E emulsified grease in hard to reach areas where scrubbing could not be performed. In this situation, a concentrated water rinse can replace scrubbing and effectively remove grease. The traditional cleaner showed no effectiveness in these hard to reach areas where scrubbing could not be accomplished.

EXAMPLE 12
Paint Stripping

| | |
|---|---|
| Ingredients: | Formulation G (Example 7) |
| Appearance: | Light golden gel. |
| Odor: | Mild odor. |
| Test Panel: | Aluminum Panel |
| Paint: | 2 Coats of White Latex Paint with a cure time of over 5 years |
| Cleaning Method: | Brush on 100% solution of Formulation G. |
| Environment: | 75° F. controlled interior environment, 50% humidity, ventilation minimum. |

The test panel was brush-coated with an approximately ⅛" thick amount of Formulation G. At 5 minutes, it was apparent to the eye that paint was being attacked and penetrated by solvent. Paint appeared soft and showed significant bubbling at many locations. After 30 minutes, the test panel was scraped with a putty knife. At the conclusion of scraping, the test panel was rinsed with water and permitted to air dry. Upon scraping, about 95% of paint was immediately removed, further scraping removed remaining paint. A second test provided the same results with a second, similar panel.

The thickening agent present in this formulation permits the solvent to be applied directly to material rather than dipped. The product takes a slightly longer time to show effectiveness in loosening paint, when compared to traditional high odor paint strippers. However, traditional paint strippers tended to dry if not immediately removed. Formulation G did not dry and permitted greater flexibility in setting a removal time.

EXAMPLE 13
Paint Stripping

| | Formulation H |
|---|---|
| Ingredients: | 46% Ethyl Lactate |
| | 46% Methyl Soyate |
| | 8% Surfactant - 6M nonyl phenol |
| Test Panels: | Wood, Oak approximately 90 years of age |
| Paint: | panel A: 2 coats of latex paint |
| | panel B: varnish |
| | panel C: lead-based oil paint |
| | (all cured over 5 years) |
| Environment: | 75° F. Controlled interior environment, 50% humidity, ventilation minimum. |

The ingredients were mixed in order itemized and stirred to first create an environmentally friendly solvent as a concentrate, Formulation H, and then a micro-emulsion within 1 minute of the addition of water (in a water amount equal to 16 weight percent of the concentrate). The micro-emulsion was applied to the test panels.

Time: After maintaining the micro-emulsion in contact with the painted surface for 15 minutes, the test panels were scrubbed with a non-absorbent nylon scrub and rinsed with water.

Results: All paint was completely removed, rinsed and dried.

EXAMPLE 14
Paint Stripping Gel

| | Formulation J: |
|---|---|
| | 40% Ethyl Lactate |
| | 40% Methyl Soyate |
| | 20% Thickener--Corn Starch |
| Test Panels: | Wood, Oak over 50 years of age. |
| Paint: | panel A: baked on enamel |
| | panel B: latex over varnish |
| | (all cured over 5 years) |

The ingredients were mixed sequentially and maintained without agitation for 30 minutes forming a stiff gel, Formulation J, that did not run when applied to wood panels in a vertical position.

Time:

Test 1—The gel was permitted to stand on the panel for 30 minutes, then scrubbed with non-absorbent nylon scrub and rinsed with water.

Test 2—The gel was permitted to dry overnight, leaving a white dry "cake frosting" appearance, then scrapped off and rinsed.

Results: The paint was completely removed in both tests. The dry paint stripping powder stripped off in Test 2 was swept up and co nvenien tly discarded as a dry powder.

EXAMPLE 15

Cleaning and Degreasing Solvent

A blend of ethyl lactate and soy methyl ester (50 weight percent of each component, Formulation K) was prepared. The blend has a flash point greater than 140° F. (60° C.). The blend was tested in a Safety-Kleen industrial large parts washer Model No. 81 (Elgin, Ill.) to wash a variety of old, dirty and used parts such as engine blocks, milling machine heads, gears and other machine parts.

At the end of the 10 week test, Formulation K was compared to a commercially available petroleum-based cleaner. The cleaning performance of Formulation K was satisfactory. Less time was required to sufficiently clean the parts with Formulation K as compared to the petroleum-based cleaners, and Formulation K was a more effective cleaner. No new or special operating methods or procedures where required to work with or manage the Formulation K composition.

Formulation K was more effective than the petroleum-based solvents in cleaning large and highly dirty parts. The cleaned parts required more time to dry when Formulation K was used than when the petroleum-based cleaner was used. The odor of Formulation K was more noticeable than the petroleum-based solvent, but not unpleasant.

From the foregoing, it will be observed that numerous modifications and variations can be effectuated without departing from the true spirit and scope of the novel concepts of the present invention. It is to be understood that no limitation with respect to the specific examples presented is intended or should be inferred. The disclosure is intended to cover by the appended claims all such modifications as fall within the scope of the claims.

What is claimed:

1. A paint stripping or cleaning and degreasing solvent composition comprising:
    (A) about 10 to about 60 weight percent of a $C_1$–$C_4$ ester of a $C_{16}$–$C_{20}$ fatty acid having a melting point of –10° C. or less;
    (B) about 20 to about 75 weight percent of a $C_1$–$C_4$ ester of lactic acid;
    (C) zero to about 20 weight percent of a surfactant;
    (D) zero to about 20 weight percent of a thickener; and
    (E) zero to about 50 weight percent organic solvent,
    said composition being a homogeneous liquid at zero degrees C and having a closed cup flash point in excess of 60° C.

2. The composition according to claim 1 wherein said $C_1$–$C_4$ ester of a $C_{16}$–$C_{20}$ fatty acid is present at about 30 to about 60 weight percent.

3. The composition according to claim 1 wherein said $C_1$–$C_4$ ester of lactic acid is present at about 30 to about 60 weight percent.

4. The composition according to claim 1 wherein said $C_1$–$C_4$ ester of lactic acid is the ethyl ester.

5. The composition according to claim 1 wherein said $C_1$–$C_4$ ester of a $C_{16}$–$C_{20}$ fatty acid is comprised of a mixture whose fatty acids are constituted by about 70 to about 90 percent unsaturated fatty acids.

6. The composition according to claim 5 wherein said fatty acid $C_1$–$C_4$ ester is a methyl ester.

7. The composition according to claim 6 wherein said fatty acid methyl ester is a methyl ester derived from an edible oil selected from the group consisting of corn, mustard, niger-seed, olive, peanut, poppy-seed, rape-seed, safflower, sesame, soybean, sunflower-seed and wheat-germ.

8. The composition according to claim 1 wherein said surfactant is present at zero to about 5 weight percent.

9. The composition according to claim 1 wherein said organic solvent is present at zero to about 1 weight percent.

10. The composition according to claim 1 wherein said organic solvent is selected from the group consisting of mixed methyl esters of $C_3$–$C_{10}$ dibasic acids, N-methylpyrrolidone, d-limonene, tetrahydrofurfuryl alcohol and a di-$C_2$–$C_3$ alkylene glycol mono and di-$C_1$–$C_6$ alkyl ether.

11. The composition according to claim 1 wherein said thickener is present at about 4 to about 7 weight percent.

12. The composition according to claim 1 wherein the organic solvent is present at zero to about 35 weight percent.

13. The composition according to claim 1 admixed with up to about 30 weight percent water to form an emulsion.

14. A paint stripping of cleaning and degreasing solvent composition comprising:
    (A) about 30 to about 60 weight percent of a $C_1$–$C_4$ ester of a $C_{16}$–$C_{20}$ fatty acid having a melting point of –10° C. or less; and
    (B) about 30 to about 60 weight percent of a $C_1$–$C_4$ ester of lactic acid;
    said composition being a homogeneous liquid at zero degrees C and having a closed cup flash point in excess of 60° C.

15. The composition according to claim 14 further comprising:
    (C) zero to about 20 weight percent of a surfactant;
    (D) zero to about 20 weight percent of a thickener; and
    (E) zero to about 20 weight percent organic solvent.

16. A paint stripping or cleaning and degreasing solvent composition comprising:
    (A) about 20 to about 40 weight percent of a $C_1$–$C_4$ ester of a $C_{16}$–$C_{20}$ fatty acid having a melting point of –10° C. or less;
    (B) about 20 to about 40 weight percent of a $C_1$–$C_4$ ester of lactic acid;
    (C) zero to about 20 weight percent of a surfactant;
    (D) zero to about 20 weight percent of a thickener; and
    (E) zero to about 50 weight percent organic solvent, said composition being a homogeneous liquid at zero degrees C and having a closed cup flash point in excess of 60° C.

17. The composition according to claim 16 wherein said $C_1$–$C_4$ ester of lactic acid is the ethyl ester.

18. The composition according to claim 16 wherein the organic solvent is present at zero to about 20 weight percent.

* * * * *